United States Patent [19]

Schlitz

[11] Patent Number: 4,742,799
[45] Date of Patent: May 10, 1988

[54] ANIMAL TRAINING DEVICE

[76] Inventor: Marjorie G. Schlitz, 14410 Cuba Rd., Cockeysville, Md. 21030

[21] Appl. No.: 860,589

[22] Filed: May 7, 1986

[51] Int. Cl.$^4$ ............................................. A01K 31/00
[52] U.S. Cl. .......................................................... 119/29
[58] Field of Search ........................................... 119/29

[56]  References Cited
U.S. PATENT DOCUMENTS

| | | | |
|---|---|---|---|
| 655,087 | 7/1900 | Jones . | |
| 1,285,421 | 11/1918 | Seidler | 5/436 |
| 2,291,155 | 7/1942 | Gartz | 5/436 |
| 2,859,731 | 11/1958 | Sutton | 119/29 X |
| 4,607,403 | 8/1986 | Alivizatos | 5/424 |

Primary Examiner—David A. Scherbel
Assistant Examiner—Creighton Smith
Attorney, Agent, or Firm—Bruce L. Lamb

[57]  ABSTRACT

A puppy toy or comforter comprising two generally rectangular hollow bodies of fabric of similar dimensions which are filled with padding material and which are joined together in overlying relationship along three outer edges. The conjoined bodies define a cavity into which may be inserted an article, such as a clock or ticking watch, or bottle filled with warm water, for pacifying or comforting a puppy.

In a modification, the bodies are each provided with releasable fastening means at one end to facilitate removal of the padding material for cleaning.

7 Claims, 1 Drawing Sheet

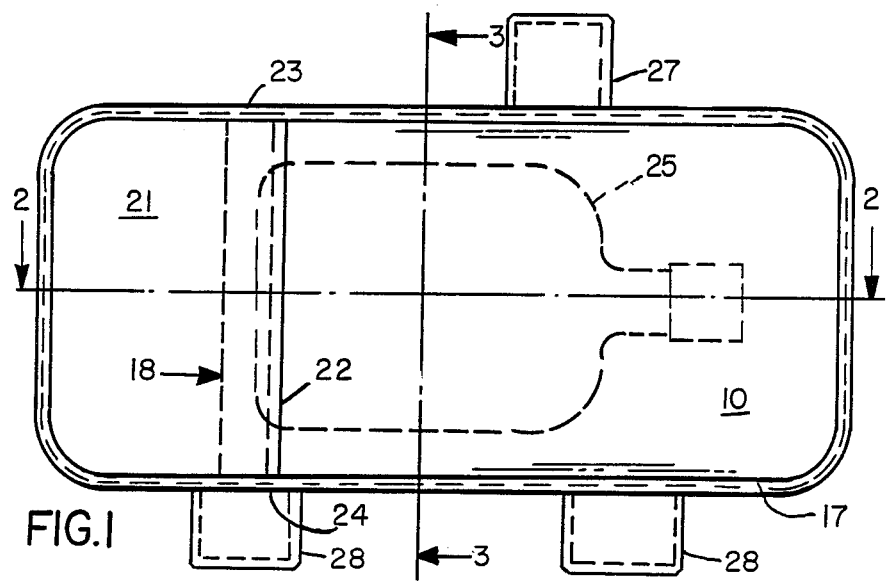
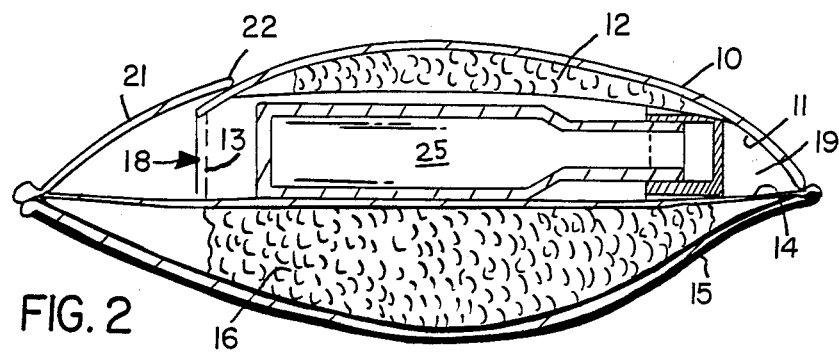
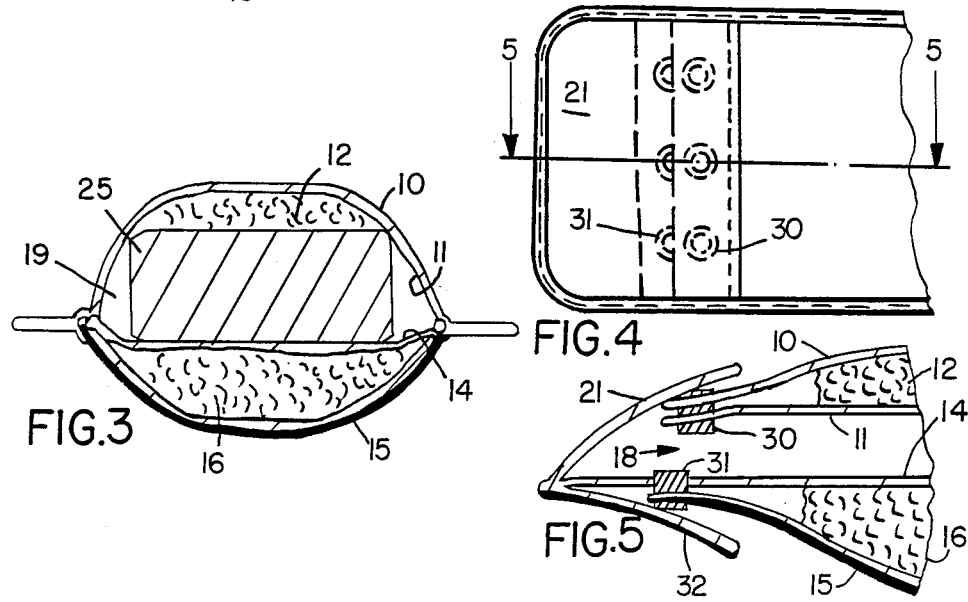

ANIMAL TRAINING DEVICE

This invention relates to animal training devices. More particularly, it relates to a stuffed toy adapted to comfort and entertain puppies.

When a puppy is separated from its mother and siblings, it misses the warmth, comfort and social presence of the pack. It is likely to cry miserably, most often at night, and even may howl for long periods of time until it adapts to its new environment.

Stuffed toys produced for children are not suitable for puppies because of the configuration and the construction materials used. Puppies, with razor-like teeth, can tear such toys and ingest the stuffing or spread it all over the house. In addition, children's toys frequently have metal or plastic buttons or parts that can be removed and swallowed. Fabric used in children's toys may be smooth and soft and not sufficiently tightly woven and strong to withstand the needle-like qualities of puppy teeth.

It has been observed that a puppy frequently adopts a common household article as a companion. For example, socks, shoes, small cushions and the like are often purloined and when later discovered, such articles are often found damaged beyond repair. Conventional puppy toys, such as rubber or plastic bones or balls, furnished to the puppy in the hope of preserving wanted articles, are short lived and may be dangerous to the puppy if torn and parts thereof are ingested. Similarly, a pacifier or comforter, such as a rubber hot water bottle to produce warmth in the puppy's sleeping chamber, is easily penetrated by the puppy's teeth.

It is an object of this invention to provide a device which will satisfy a puppy's presumed needs for the feelings of warmth and security formerly found in the presence of its mother and siblings.

It is a further object of this invention to provide a device which comforts a puppy by simulating the heart beat of the mother or a sibling.

It is another object of the invention to provide a device for comforting or pacifying a puppy by providing warmth, either through reflection or retention of the puppy's own body heat or through supplementary means such as a hot water bottle, thereby simulating conditions at the mother's side.

It is still another object of the invention to provide a device having the above stated characteristics which is durable, and which is not hazardous to the health and safety of the puppy or the household.

BRIEF DESCRIPTION

Briefly, the invention comprises a puppy toy of a generally tubular or loaf shape which is formed of overlying panels of durable fabric. The panels enclose top and bottom layers of padding and an accessible cavity between the padding layers. The top padding layer is made somewhat shorter than the bottom padding layer. The panels enclosing the top padding layer are joined together by stitching running along the outer edges, as are the panels enclosing the bottom padding layer. The enclosed padding layers are positioned in overlying relationship and are joined together by stitching along the three outer contiguous edges thereof. A slot providing access to the space separating the top padding layer from the bottom padding layer is thereby provided at one end of the assembled padding layers. The slot is covered by a flap secured to the adjacent edges of the lower padding layer. The flap may be folded back to provide access to the slot for insertion and retention in the space separating the top and bottom padding layers of an object such as a clock or ticking switch or a hot water bottle.

In a modification of the invention, the panels enclosing the top padding layer and those enclosing the bottom padding layer are each secured together along one edge by releasable fastening means to facilitate removal of the padding material for laundering or cleaning.

DESCRIPTION OF THE DRAWINGS

FIG. 1 is a plan view of the invention.

FIG. 2 is a cross section taken along the line 2—2 of FIG. 1;

FIG. 3 is a cross section taken along the line 3—3 of FIG. 1;

FIG. 4 is a partial plan view of a modification of the invention; and

FIG. 5 is a cross section taken along the line 5—5 of FIG. 4.

DETAILED DESCRIPTION

Referring to FIGS. 1-3, the invention comprises an upper outer fabric panel 10 and an upper inner fabric panel 11 positioned in overlying relationship. Panels 10 and 11 are generally rectangular and are generally equally dimensioned in length and width, except that panel 10 is slightly larger than panel 11 to accommodate an upper layer 12 of padding material. Panels 10 and 11 are joined together by stitching along the three outer edges. Then the layer 12 of padding is inserted and is enclosed therebetween by stitching 13 (FIG. 2) runing along the fourth edge of the panels.

An upper inner fabric panel 14 and a lower outer fabric panel 15 are positioned in overlying relationship and are joined together by stitching along three edges. A lower layer 16 of padding material is inserted between panels 14 and 15 and is enclosed therebetween by stitching along the fourth edge of the panels.

Panels 14 and 15 are generally of the same width as panels 10 and 11 but are longer than the latter. Again, panel 15 is made somewhat larger than panel 14 to accommodate the lower padding layer 16.

When the upper padding layer, enclosed by panels 10 and 11, is superposed upon the lower padding layer, enclosed by panels 14 and 15, and the padding layers are joined together by stitching 17 generally extending the length of the three outer edges of panels 10 and 11, a slot 18 is formed which provides access to the space 19 separating panels 11 and 14. Slot 18 is normally closed by a flap 21, one edge 22 of which extends over and covers slot 18 and the other edges of which are stitched into the seam, from point 23 around to point 24, which joins the end portions of panels 10, 11, and 14, 15 adjacent to slot 18.

Flap 21 may be folded back to expose slot 18 through which an article, such as a hot water bottle 25 or another comforting article, may be inserted into space 19. When flap 21 is returned to its original position, the article contained in space 19 will be retained against dislodgement by the puppy's shaking or worrying of the toy. Tabs 27, 28 sewn into the seam joining panels 10, 11 and 14, 15 provide the puppy with an easy grasp of the toy for carry or play. The assembled toy may suitably be from 8-12 inches long and from 3-5 inches wide, or larger sizes for larger dogs.

FIGS. 4 and 5 show a modification of the invention which facilitates cleaning or laundering of the entire toy. In the modification, the ends of panels 10 and 11 instead of being joined by stitching, as in FIGS. 1-3, are closed by releasable fastening means such as snap fasteners 30. Likewise the ends of panels 14 and 15 are closed by releasable fastening means, such as snap fasteners 31. The end of panel 15 at the releasable joint provided by fasteners 31 is covered by a lower flap 32 sewn into the outer seam in the same manner as upper flap 21. Flaps 21 and 32 may be folded back to expose fasteners 30 and 31 and the ends panels 10, 11 and 14, 15 may be easily separated for removal of the padding materials 12 and 16. After cleaning, the toy may be reassembled simply by reversing the disassembly procedure. Preferably the padding materials 12 and 16 are each single pieces of durable resilient stock, such as towelling or blanket material, which is rolled or folded into appropriate shape for containment by the enclosing panels. Such single piece materials have the advantage not only in ease of cleaning but also in that they are not subject to being scattered about if they should be displaced from the toy during play by the puppy.

The invention claimed is:

1. An animal training device for providing comfort and amusement to a puppy, comprising,
    a first, generally rectangular hollow body formed of sheet-like pliable material;
    a second, generally rectangular holow body formed of sheet-like plitable material, said second body having dimensions generally conforming to the dimensions of said first body;
    a first mass of resilient padding material enclosed within said first body;
    a second mass of resilient padding material enclosed within said second body; and
    means securing said first body to said second body in overlying relationship with three outer edges of said first body being joined along the length thereof to contiguous portions of three outer edges of said second body underlying said first body, the fourth edges of both said first and second bodies being unsecured to one another;
    whereby a cavity lying between said first and second bodies is defined by the conjoined edges of said first and second bodies, said cavity being accessible at the fourth edge of said first body for insertion therein of an article intended to give comfort to a puppy.

2. A device as claimed in claim 1 with additionally, at least one tab secured at the conjoined edges of said first and second bodies and extending outwardly from said bodies to facilitate carrying of said device by a puppy.

3. A device as claimed in claim 1, with additionally, a generally rectangular flap of sheet-like, pliable material, said flap having a length to extend from said fourth edge of said second body to extend beyond said fourth edge of said first body and a width substantially equal to the width of said second body; and means securing said flap in overlying relationship to said second body with three outer edges of said flap being secured to contiguous edges of said second body and with the fourth outer edge of said flap overlying but unsecured to said fourth edge of said first body.

4. A device as claimed in claim 3 wherein the material from which said first and second bodies and said flap are formed is durable fabric.

5. A device as claimed in claim 4 wherein the material from which ech of said first and second masses of padding material is formed comprises a single sheet of resilient fabric which is rolled or folded for containment by said first or second body.

6. A device as claimed in claim 5 wherein said first and second bodies are each provided, along said fourth edges thereof, with releasable fastening means for closure of said first and second bodies, whereby insertion and removal of said first and second masses of padding material into and from said first and second bodies is facilitated.

7. A device as claimed in claim 6 with additionally, a second flap of durable fabric material secured to said outer side of second body adjacent to said fourth edge thereof and adapted to cover and protect said releasable fastening means thereon.

* * * * *